(12) United States Patent
McDaniel et al.

(10) Patent No.: US 9,736,153 B2
(45) Date of Patent: Aug. 15, 2017

(54) TECHNIQUES TO PERFORM FEDERATED AUTHENTICATION

(75) Inventors: Paul McDaniel, Redmond, WA (US); Neil Shipp, Redmond, WA (US)

(73) Assignee: MICROSOFT TECHNOLOGY LICENSING, LLC, Redmond, WA (US)

( * ) Notice: Subject to any disclaimer, the term of this patent is extended or adjusted under 35 U.S.C. 154(b) by 2023 days.

(21) Appl. No.: 12/147,633

(22) Filed: Jun. 27, 2008

(65) Prior Publication Data

US 2009/0328178 A1    Dec. 31, 2009

(51) Int. Cl.
| | |
|---|---|
| *G06F 7/04* | (2006.01) |
| *H04L 29/06* | (2006.01) |
| *G06F 21/31* | (2013.01) |
| *H04L 9/32* | (2006.01) |
| *G06F 21/41* | (2013.01) |

(52) U.S. Cl.
CPC .......... *H04L 63/0884* (2013.01); *G06F 21/31* (2013.01); *H04L 9/3213* (2013.01); *H04L 9/3271* (2013.01); *H04L 63/105* (2013.01); *G06F 21/41* (2013.01); *G06F 2221/2115* (2013.01); *H04L 63/0815* (2013.01); *H04L 2209/76* (2013.01)

(58) Field of Classification Search
CPC .. G06F 21/41; G06F 21/31; G06F 2221/2115; H04L 63/0815; H04L 63/0884; H04L 9/3213; H04L 9/3271; H04L 63/105; H04L 2209/76
USPC .......................................... 726/8, 9
See application file for complete search history.

(56) References Cited

U.S. PATENT DOCUMENTS

| 7,219,154 B2 | 5/2007 | Blakley, III et al. |
| 7,240,192 B1 | 7/2007 | Paya et al. |
| 7,370,351 B1 * | 5/2008 | Ramachandran et al. ........ 726/8 |
| 2003/0005163 A1 * | 1/2003 | Belzile .......................... 709/249 |

(Continued)

OTHER PUBLICATIONS

"Federated Authentication", http://www.authenticationworld.com/Authentication-Federation/.

(Continued)

*Primary Examiner* — Oscar Louie
*Assistant Examiner* — James Forman

(57) ABSTRACT

Techniques to perform federated authentication are described. An apparatus may comprise a resource server may have an authentication proxy component to perform authentication operations on behalf of a client. The authentication proxy component comprises an authentication handling module operative to receive an authentication request to authenticate the client using a basic authentication protocol. The authentication proxy component also comprises an authentication discovery module communicatively coupled to the authentication handling module, the authentication discovery module operative to discover an identity server for the client. The authentication proxy component further comprises an authentication manager module communicatively coupled to the authentication discovery module, the authentication manager module operative to retrieve authentication information from the identity server using an enhanced authentication protocol, and authenticate the client to access resource services using the authentication information. Other embodiments are described and claimed.

18 Claims, 5 Drawing Sheets

(56) References Cited

U.S. PATENT DOCUMENTS

| | | |
|---|---|---|
| 2004/0003287 A1 | 1/2004 | Zissimopoulos et al. |
| 2004/0128546 A1* | 7/2004 | Blakley et al. ............... 713/201 |
| 2004/0230831 A1 | 11/2004 | Spelman et al. |
| 2005/0114701 A1* | 5/2005 | Atkins .................... H04L 63/08 726/4 |
| 2005/0223217 A1* | 10/2005 | Howard et al. ............... 713/155 |
| 2006/0123234 A1* | 6/2006 | Schmidt ............. H04L 63/0209 713/168 |
| 2006/0123472 A1* | 6/2006 | Schmidt et al. ................... 726/8 |
| 2006/0236382 A1* | 10/2006 | Hinton et al. ..................... 726/8 |
| 2006/0248598 A1* | 11/2006 | Johnson et al. ................ 726/27 |
| 2007/0081197 A1 | 4/2007 | Omoigui |
| 2007/0089167 A1* | 4/2007 | Villavicencio ..................... 726/5 |
| 2007/0143829 A1 | 6/2007 | Hinton et al. |
| 2007/0143836 A1* | 6/2007 | Bowers .............. H04L 63/0884 726/10 |
| 2007/0169171 A1* | 7/2007 | Kumar et al. ..................... 726/2 |
| 2007/0294752 A1* | 12/2007 | Kinser et al. ..................... 726/8 |
| 2008/0010665 A1 | 1/2008 | Hinton et al. |
| 2008/0021997 A1* | 1/2008 | Hinton ................ H04L 63/0815 709/225 |
| 2008/0263629 A1* | 10/2008 | Anderson .......................... 726/2 |
| 2009/0119763 A1* | 5/2009 | Park et al. ........................ 726/8 |
| 2009/0300024 A1* | 12/2009 | Schneider ....................... 707/10 |
| 2009/0320116 A1* | 12/2009 | Guo et al. ......................... 726/9 |
| 2010/0115598 A1* | 5/2010 | Barriga et al. .................... 726/8 |

OTHER PUBLICATIONS

"Federated Identity: Single Sign-On Among Enterprises", http://developers.sun.com/identity/reference/techart/federated.html.

"New Diagnostic Tool for Active Directory Federation Services", http://identity-des.com/2008/01/30/new-adfs-diagnostic-tool/.

"Federation of Identities in a Web Services World", A joint whitepaper from IBM Corporation and Microsoft Corporation, Version 1.0, Jul. 8, 2003, pp. 1-19.

\* cited by examiner

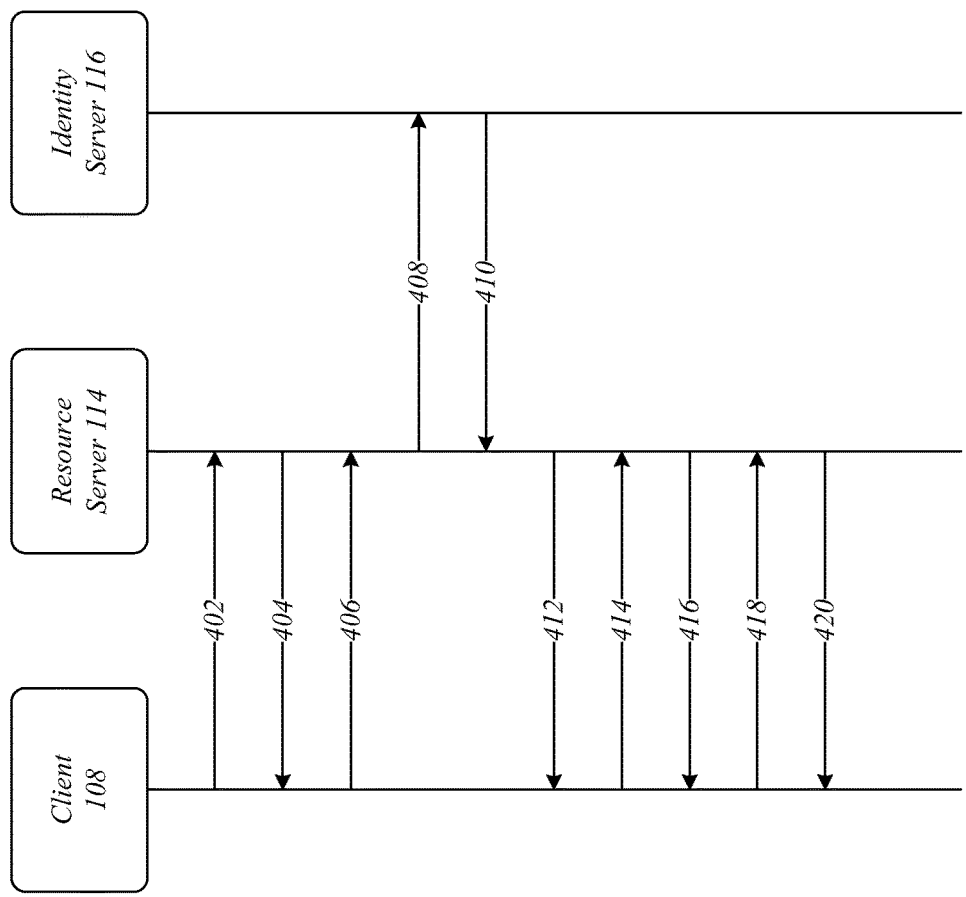

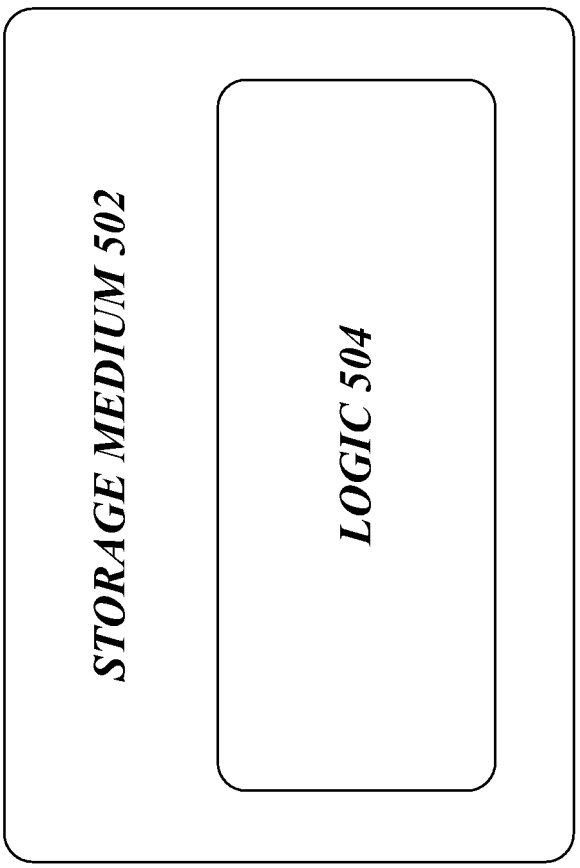

TECHNIQUES TO PERFORM FEDERATED AUTHENTICATION

BACKGROUND

The Web programming model makes it possible to build and deploy Web applications incrementally and in a decentralized manner. The Web programming model is considered "loosely coupled" and provides Web applications having a high degree of interoperability, scalability, and manageability. Generally, Web applications operate with at least a client that understands both HTTP and HTML, such as a Web browser. Examples of Web applications include e-commerce web sites such as www.microsoft.com.

In contrast, Web services adapt the loosely coupled Web programming model for use in services that do not require a visual user interface, and therefore does not use a web browser. Web services typically incorporate some combination of programming, data and (possibly) human resources to provide services made available from an organization's Web server to other Web-connected programs. Exemplary Web services may include major services, such as storage management and customer relationship management (CRM), down to much more limited services, such as online stock quotations and online bidding for an auction item.

In either case, some Web applications and Web services may need to authenticate a user prior to granting access to the user. In some cases, however, a web server may communicate using network protocols not supported by the client. For example, federated logon allows a client from one organization to access web services provided by another organization. Federated logon, however, needs a specialized set of authentication protocols that is not ubiquitously available to some client devices. This limitation detracts from the desired convenience and seamless access potentially expected of web services. Further, this would necessitate a massive upgrade of legacy clients to access new features implemented by innovative web servers. It is with respect to these and other considerations that the present improvements have been needed.

SUMMARY

This Summary is provided to introduce a selection of concepts in a simplified form that are further described below in the Detailed Description. This Summary is not intended to identify key features or essential features of the claimed subject matter, nor is it intended as an aid in determining the scope of the claimed subject matter.

Various embodiments are generally directed to techniques to perform federated authentication are described. Some embodiments are particularly directed to techniques to authenticate a client for accessing various web services using network protocols accessible to the client. In one embodiment, for example, an apparatus may comprise an operating environment with a client and a resource server communicatively coupled through a network. The resource server may have an authentication proxy component to perform authentication operations on behalf of a client. The authentication proxy component comprises an authentication handling module operative to receive an authentication request to authenticate the client using a basic authentication protocol. The authentication proxy component also comprises an authentication discovery module communicatively coupled to the authentication handling module, the authentication discovery module operative to discover an identity server for the client. The authentication proxy component further comprises an authentication manager module communicatively coupled to the authentication discovery module, the authentication manager module operative to retrieve authentication information from the identity server using an enhanced authentication protocol, and authenticate the client to access resource services using the authentication information. Other embodiments are described and claimed.

These and other features and advantages will be apparent from a reading of the following detailed description and a review of the associated drawings. It is to be understood that both the foregoing general description and the following detailed description are explanatory only and are not restrictive of aspects as claimed.

BRIEF DESCRIPTION OF THE DRAWINGS

FIG. 4 illustrates an embodiment of a message flow.

FIG. 5 illustrates an embodiment of an article of manufacture.

DETAILED DESCRIPTION

Figure 1:
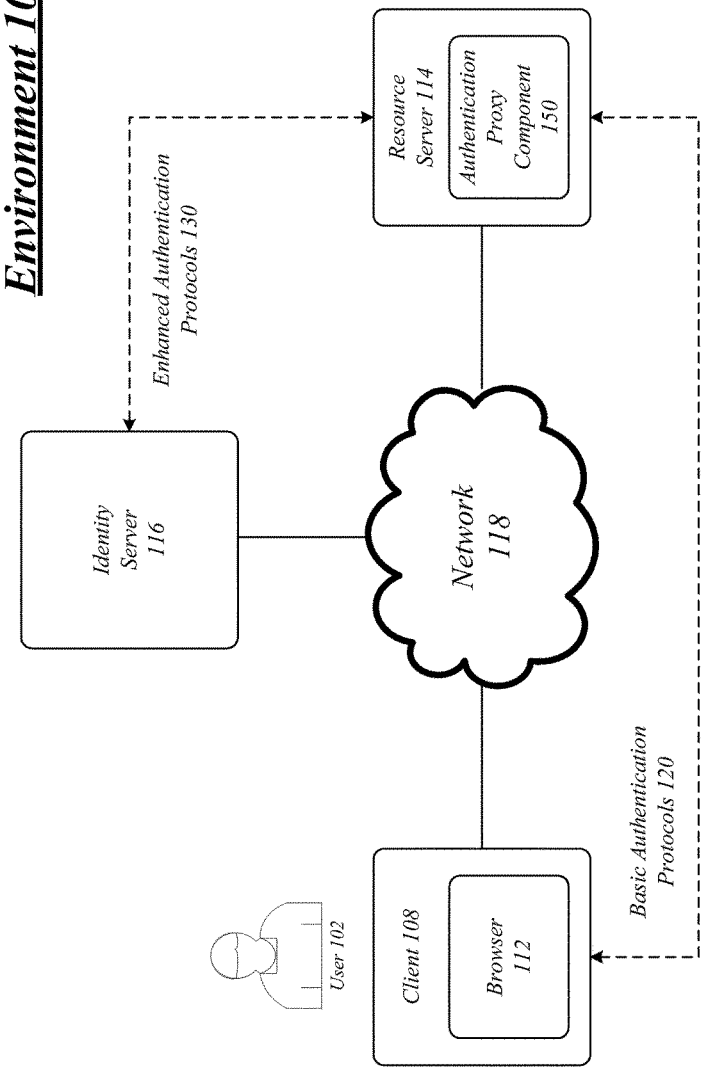
FIG. 1 illustrates an embodiment of an operating environment.

Various embodiments include physical or logical structures arranged to perform certain operations, functions or services. The structures may comprise physical structures, logical structures or a combination of both. The physical or logical structures are implemented using hardware elements, software elements, or a combination of both. Descriptions of embodiments with reference to particular hardware or software elements, however, are meant as examples and not limitations. Decisions to use hardware or software elements to actually practice an embodiment depends on a number of external factors, such as desired computational rate, power levels, heat tolerances, processing cycle budget, input data rates, output data rates, memory resources, data bus speeds, and other design or performance constraints. Furthermore, the physical or logical structures may have corresponding physical or logical connections to communicate information between the structures in the form of electronic signals or messages. The connections may comprise wired and/or wireless connections as appropriate for the information or particular structure. It is worthy to note that any reference to "one embodiment" or "an embodiment" means that a particular feature, structure, or characteristic described in connection with the embodiment is included in at least one embodiment. The appearances of the phrase "in one embodiment" in various places in the specification are not necessarily all referring to the same embodiment.

Conventional authentication techniques are unsatisfactory for a number of different reasons. For example, a client such as a user typically needs to authenticate prior to accessing an online web service. In an effort to increase convenience and seamless access for clients and web services provided over a public network, such as the Internet, a basic set of well-known authentication protocols have been established for the public network. Examples of such well-known authentication protocols include the Hypertext Transfer Protocol (HTTP) Basic Access Authentication (BASIC) authentication protocol (HTTP-BASIC), the HTTP Digest Access Authentication, and so forth. Using HTTP-BASIC, for example, a client may establish a user account and a password with an online web service, and then use the user account and password for authentication operations when accessing the online web service. In this case, a user is the authoritative source for verifying a digital identity for the user.

More sophisticated web services, however, allow a client to authenticate using a foreign identity, such as in federated logons. These more sophisticated web services, however, utilize an enhanced set of authentication protocols that are different from the basic set of well-known authentication protocols established for a public network. Examples of enhanced authentication protocols may include the NT Local Area Network Manager (NTLM) authentication protocol, the Remote Procedure Call (RPC) authentication protocol, the Web Services Security (WS-Security) suite of protocols including WS-Federation and WS-Trust, and so forth. The incompatibility of the basic authentication protocols and enhanced authentication protocols increases the complexity of allowing a client to use a foreign identity to authenticate with an online web service. This limitation detracts from the desired convenience and seamless access potentially expected of Web applications.

To solve these and other problems, the various embodiments are directed to federation authentication techniques to authenticate a client to access resource services provided by a resource server, such as a web service provided by a web server. More particularly, some embodiments authenticate a client using the resource server as an authentication proxy for the client. The resource server performs authentication operations on behalf of the client to access resource services provided by the resource server or another network device. For example, a client may utilize basic authentication protocols to basically authenticate a user with a resource server. The resource server may utilize enhanced authentication protocols to perform enhanced authentication operations for the user, such as confirming a digital identity with an identity server for the user or a third-party identity server. Once authenticated, the client may access resource services provided by the resource server or some other network device. As a result, this increases the desired convenience and seamless access potentially expected of web services. Further, this would allow legacy clients to access new features implemented by innovative web servers.

FIG. 1 illustrates a block diagram for an operating environment 100. The operating environment 100 may comprise various elements designed for implementation by a single entity environment or a multiple entity distributed environment. Each element may be implemented as a hardware element, software element, or any combination thereof, as desired for a given set of design parameters or performance constraints. Examples of hardware elements may include devices, components, processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), memory units, logic gates, registers, semiconductor device, chips, microchips, chip sets, and so forth. Examples of software elements may include any software components, programs, applications, computer programs, application programs, system programs, machine programs, operating system software, middleware, firmware, software modules, routines, subroutines, functions, methods, interfaces, software interfaces, application program interfaces (API), instruction sets, computing code, computer code, code segments, computer code segments, words, values, symbols, or any combination thereof.

As used herein the terms "system," "subsystem," "component," and "module" are intended to refer to a computer-related entity, comprising either hardware, a combination of hardware and software, software, or software in execution. For example, a component can be implemented as a process running on a processor, a processor, a hard disk drive, multiple storage drives (of optical and/or magnetic storage medium), an object, an executable, a thread of execution, a program, and/or a computer. By way of illustration, both an application running on a server and the server can be a component. One or more components can reside within a process and/or thread of execution, and a component can be localized on one computer and/or distributed between two or more computers as desired for a given implementation. The embodiments are not limited in this context.

In the illustrated embodiment shown in FIG. 1, the operating environment 100 may include a client 108, a resource server 114 and an identity server 116, all communicating through a public network 118. The public network 118 may comprise a packet-switched network, although some portions of the public network 118 may comprise a circuit-switched network with appropriate packet-switched network interfaces. Although the operating environment 100 as shown in FIG. 1 has a limited number of elements in a certain topology, it may be appreciated that the operating environment 100 may include more or less elements in alternate topologies as desired for a given implementation.

The client 108 may generally comprise any electronic device designed for managing, processing or communicating information in the operating environment 100. Examples for the client 108 may include without limitation a computing device, a mobile device, a personal digital assistant, a mobile computing device, a smart phone, a cellular telephone, a handset, a one-way pager, a two-way pager, a messaging device, a computer, a personal computer (PC), a desktop computer, a laptop computer, a notebook computer, a handheld computer, a server, a server array or server farm, a web server, a network server, an Internet server, a work station, a mini-computer, a main frame computer, a supercomputer, a network appliance, a web appliance, a distributed computing system, multiprocessor systems, processor-based systems, consumer electronics, programmable consumer electronics, television, digital television, set top box, wireless access point, base station, subscriber station, mobile subscriber center, radio network controller, router, hub, gateway, bridge, switch, machine, or combination thereof. The embodiments are not limited in this context.

In one embodiment, the client 108 may comprise a client computing device with a web browser 112 and a client application 113. The computing device may comprise, for example, a personal computer, a notebook computer, a handheld computer, a smart phone, and so forth. The web browser 112 communicates with web servers primarily using HTTP to fetch web pages. HTTP allows web browsers to submit information to web servers as well as fetch web pages from them. Examples for the web browser 112 may include without limitation MICROSOFT® WINDOWS® INTERNET EXPLORER made by Microsoft Corporation, OPERA made by Opera Software Company, SAFARI made by Apple Inc., and so forth. The client application program 113 may comprise any suitable client application program, such as a productivity application program from the MICROSOFT OFFICE suite of productivity application programs, made by Microsoft Corporation. One example for the client application program 113 may include MICROSOFT OFFICE OUTLOOK®, made by Microsoft Corporation, among others. Communications of the client 108 can be accomplished, for example, via the web browser 112 through Hypertext Markup Language (HTML) messages and POST forms, although other mechanisms including scripting languages such as JavaScript or ECMAScript may also be used.

The client 108 may use the web browser 112 to access various online web services through the public network 118. Some features of an online web service are openly available to any user visiting a web site. For example, the user 102 may use the client 108 and the web browser 112 to access a public commercial web site, such as www.microsoft.com, to read general information about products made by Microsoft Corporation. Other features of an online web service, however, may require authentication before receiving access. For example, the public commercial web site www.microsoft.com may have restricted portions offering more detailed information to account holders. In this case, the user 102 may need to open a new account with a password prior to gaining access to the restricted portions. This may be accomplished using various basic authentication protocols 120 that are known to both the client 108 and the network device providing the web services. Examples of basic authentication protocols 120 include without limitation various HTTP authentication protocols such as the HTTP-BASIC authentication protocol and the HTTP Digest Access Authentication, as well as other well-known protocols used for the public network 118. For example, HTTP provides a simple challenge-response authentication mechanism that may be used by a server to challenge a client request and by a client to provide authentication information. It uses an extensible, case-insensitive token to identify the authentication scheme, followed by a comma-separated list of attribute-value pairs which carry the parameters needed for achieving authentication via that scheme. The basic authentication protocols 120 allow the user 102 to perform a basic or minimum level of authentication operations common to many web browsers and web service providers.

In some cases, the user 102 may desire to use the web browser 112 of the client 108 to access various online web services through the public network 118 as offered by the resource server 114. Additionally or alternatively, the client application 113 of the client 108 may attempt to access such online web services offered by the resource server 114. In such cases, the client application 113 does not necessarily need to use the web browser 112 to access the resource services, but rather communicates directly with the resource server 114 via an appropriate network protocols, such as HTTP or HTTPS.

The resource server 114 may provide various resource services as provided by resident resource application programs. The resource server 114 may comprise any of the electronic devices as described with reference to the client 108. In one embodiment, for example, the resource server 114 may comprise a MICROSOFT EXCHANGE SERVER® made by Microsoft Corporation. The resource server 114 may provide e-mail, calendaring, contacts and tasks functionality and support for mobile and web-based access to information, as well as data storage. The resource server 114 may comprise or communicate with a message store for storing items including e-mail messages and other data in mailboxes and folders and may provide an interface for communicating with various e-mail clients and allowing access to the message store. The resource server 114 also may comprise or communicate with a directory containing information about the users of the system and configuration information which may be used by a message transfer subsystem to perform various routing and transfer operations for e-mail messages intended for recipients on the server, another server in the same organization, and/or for recipients on the Internet or other messaging systems.

In some embodiments, the resource server 114 may support various web services including web access, mobile access, and synchronization functionality, Internet Information Services (IIS) and Internet Server Application Programming Interface (ISAPI) applications providing SMTP, NNTP, IMAP4, and POP3 services to allow Internet users to access to messaging data over a variety of Internet access protocols and HTTP-based protocols including remote procedure call (RPC) over HTTP communication. In some implementations, data may be formatted as compressed Wireless Binary XML (WbXML) data to make efficient use of bandwidth for mobile clients. In addition to standard Internet protocols, the server also may support communication over proprietary or non-standard protocols when used by a company or other organization.

In various embodiments, the resource server 114 may offer resource services that require an enhanced level of authentication prior to access. For example, the resource server 114 may allow for federated logons that need special authentication protocols not common to many clients, including the client 108. The resource server 114 may require authentication operations provided by various enhanced authentication protocols 130. Examples of enhanced authentication protocols may include without limitation the NTLM authentication protocol, the RPC authentication protocol, the WS-Security suite of protocols including WS-Federation and WS-Trust, and so forth. Since the client 108 is not capable of using the enhanced authentication protocols 130, however, the client 108 is not capable of engaging in the enhanced authentication operations needed by the resource server 114 to access the resource services provided by the resource server 114, or another network device accessible via the resource server 114.

To overcome this and other limitations, the resource server 114 may implement an authentication proxy component 150. The authentication proxy component 150 may implement various federated authentication techniques that permit the resource server 114 to operate as an authentication proxy for the client 108. The client 108 and the resource server 114 are both capable of communicating using the basic authentication protocols 120. Consequently, the client 108 and the resource server 114 perform basic authentication operations utilizing the basic authentication protocols 120. Since the resource server 114 is capable of communicating using the enhanced authentication protocols 130 as well, the authentication proxy component 150 of the resource server 114 is further designed to perform enhanced authentication operations on behalf of the client 108 with other network devices using the same enhanced authentication protocols 130.

In one embodiment, for example, the resource server 114 may discover and communicate with an identity server 116 to verify a digital identity for the user 102 using the enhanced authentication protocols 130. The identity server 116 may generally comprise any electronic device similar to those described with reference to the client 108 and the resource server 114. As with the resource server 114, the identity server 116 is capable of communicating and performing enhanced authentication operations using the enhanced authentication protocols 130.

The identity server 116 provides an online identity management service designed to verify an identity for the user 102. The identity server 116 maintains user accounts for all users it services, such as within a common realm. For example, the identity server 116 maintains a user account for the user 102, and stores various types of identity information suitable for use in verifying an identity for the user 102 in support of authentication operations. The identity information may include any information suitable for establishing a trust relationship for the user 102, such as user names, account information, personal information for a user such as a home or office address and contact numbers, user identifiers, security credentials, security tokens, security certificates, permissions, and so forth. In one embodiment, the identity server 116 may be implemented as a security token service (STS) server, such as the MICROSOFT® LIVE LABS SECURITY TOKEN SERVICE which is part of the MICROSOFT WINDOWS® LIVE range of services, made by Microsoft Corporation, Redmond, Wash. Additionally or alternatively, the identity server 116 may be implemented as a MICROSOFT ACTIVE DIRECTORY®. Active Directory is an implementation of lightweight directory access protocol (LDAP) directory services to provide central authentication and authorization services for network computers. Active Directory also allows administrators to assign policies, deploy software, and apply updates to an organization. Active Directory stores information and settings in a central database. Active Directory networks can vary from a small installation with a few hundred objects, to a large installation with millions of objects. The embodiments, however, are not limited to these examples.

In some cases, the identity server 116 may comprise part of the same organization as the client 108. Additionally or alternatively, the identity server 116 may not comprise part of the same organization as the client 108, but rather is part of a separate organization, such as a third-party provider of identity management services. It should be understood that when the user at client 108 and the identity server 116 are considered to exist logically within an organization, they may be physically located anywhere. For example, the client 108 and/or the identity server 116 can actually be off-site or otherwise physically "outside" the physical premises of the organization. By logically existing within the same organization, however, the user 102 or a system administrator for the organization may establish various user accounts for the user 102 and associated identifying information needed to verify a digital identity for the user 102, and thereby be used as a basis for forming a trust relationship with other network devices and organizations.

In general operation, the user 102 may use the client 108 and the web browser 112 and/or the client application 113 to access the resource server 114 via the public network 118. The resource server 114 needs enhanced authentication operations using the enhanced authentication protocols 130. Since the client 108 is limited to the basic authentication protocols 120, the client 108 and the resource server 114 engage in basic authentication operations using the basic authentication protocols 120. The authentication proxy component 150 then utilizes user credentials (e.g., a user name and/or password) gained during the basic authentication operations to discover the identity server 116 providing identity management services for the user 102. Once the authentication proxy component 150 discovers the identity server 116, it performs enhanced authentication operations with the identity server 116 utilizing the enhanced authentication protocols 130. The authentication proxy component 150 sends the user credentials gathered using the basic authentication protocols 120 to the identity server 116. The identity server 116 uses the user credentials and identification information for the user 102 stored by the identity server 116 to generate authentication information for the user 102. The identity server 116 then forwards the authentication information to the resource server 114. The authentication proxy component 150 receives the authentication information for the user 102, and stores the authentication information in a shadow account created for the user 102 by the resource server 114. The authentication proxy component 150 may utilize the authentication information to authenticate the user 102 to gain access to resource services provided by the resource server 114 or another resource server. In this manner, the resource server 114 may operate as an authentication proxy for the client 108 to access resource services requiring enhanced authentication operations, without having the client 108 upgrade to utilize the enhanced authentication protocols 130. The operating environment 100 in general, and the resource server 114 in particular, may be described in more detail with reference to FIGS. 2-7.

It is worthy to note that in some cases the client 108 and the resource server 114 may optionally belong to different organizations having a federated agreement between them. For example, the organizations may have formed a federation through agreements, standards, and/or cooperative technologies to make user identity and entitlements portable between the organizations. The organizations are often termed "realms" in the federation context. Federated identity, or the federation of identity, describes the technologies, standards and use-cases which serve to enable the portability of identity information across otherwise autonomous security domains. Identity federation enables users of one domain to securely access data or systems of another domain seamlessly, and without the need for completely redundant user administration. Federation is enabled through the use of open industry standards and/or openly published specifications, such that multiple parties can achieve interoperability for common use cases. Typical use-cases involve things such as cross-domain, web-based single sign-on, cross-domain user account provisioning, cross-domain entitlement management and cross-domain user attribute exchange. Federated identity techniques may facilitate user-to-user, user-to-application or application-to-application use-case scenarios at both the browser tier and the web services tier. It can involve high-trust, high-security scenarios as well as low-trust, low security scenarios. It can also involve user-centric use-cases, as well as enterprise-centric use-cases. Although some embodiments may consider the client 108 and the resource server 114 as belonging to separate organizations having a federated agreement between them, other embodiments may be implemented where the client 108 and the resource server 114 belong to separate organizations without a federated agreement between them.

Figure 2:
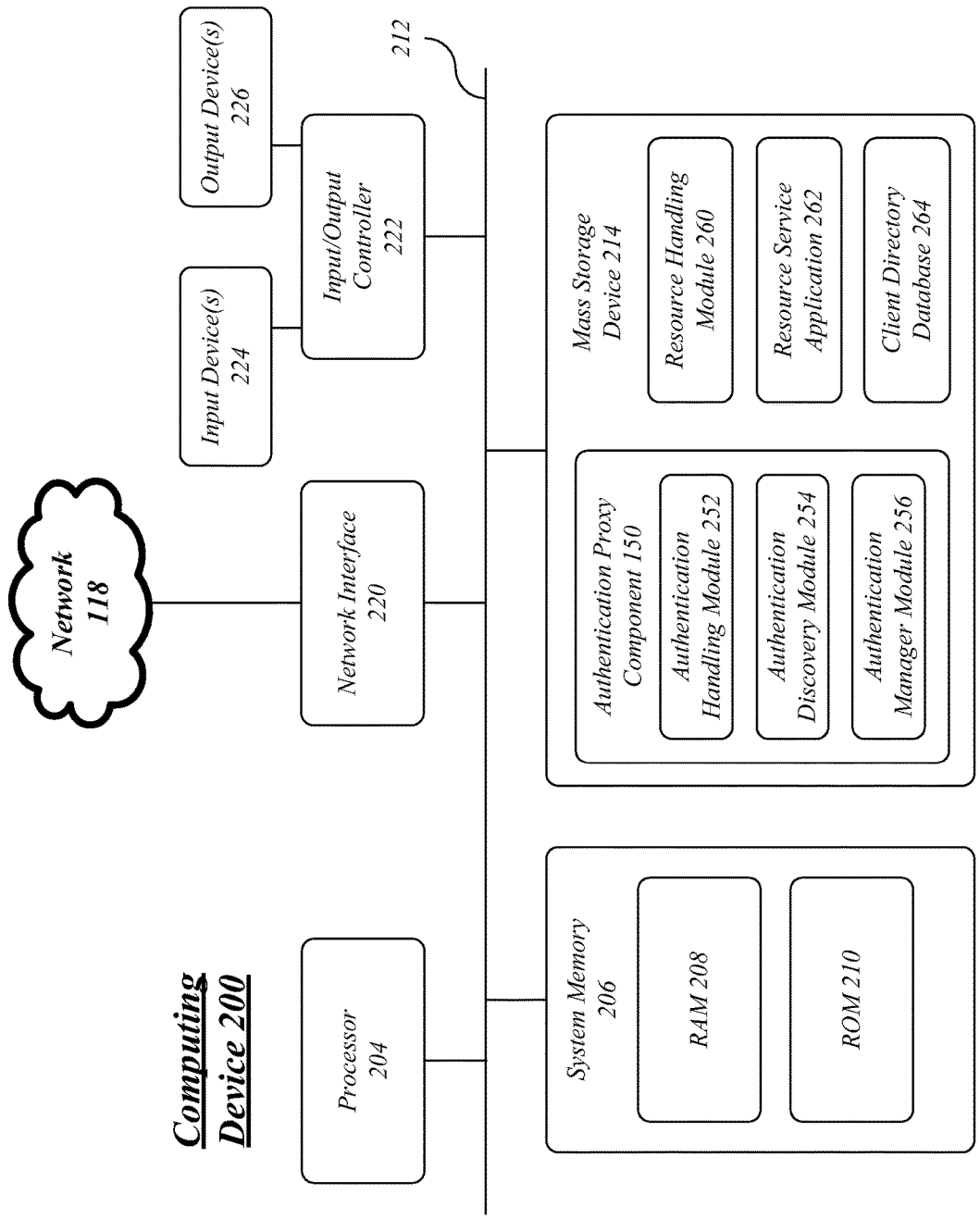
FIG. 2 illustrates an embodiment of a resource server.

FIG. 2 provides an illustrative architecture for a computing device 200 suitable for practicing the various embodiments. The computing device 200 may be representative of, for example, some of the elements suitable for use by the client 108 and/or the resource server 114. As shown, the computing device 200 illustrates a conventional computing architecture for a personal or server computer, including a processing system comprising a processor 204 and a system memory 206. The system memory 206 may include, among other types of memory, a random access memory (RAM) 208 and a read-only memory (ROM) 210. An input/output (I/O) system, such as a basic I/O system (BIOS), may implement routines to assist in transferring information between elements within the computing device 200, such as during startup operations, using logic stored in the ROM 210. A system bus 212 communicatively couples all of the elements of the computing device 200 to facilitate information transfer and data processing operations.

The computing device 200 further includes a mass storage device 214 for storing an operating system, such as the operating system, as well as other program modules and program data. The mass storage device 214 also may store various application programs, as described in greater detail below.

The mass storage device 214 is connected to the processor 204 through a mass storage controller (not shown) connected to the system bus 212. The mass storage device 214, and its associated computer-readable media, provides non-volatile storage for the computing device 200. Although the description of computer-readable media contained herein refers to a mass storage device, such as a hard disk or CD-ROM drive, it should be appreciated by those skilled in the art that computer-readable media can be any available media that can be accessed by the computing device 200. By way of example, and not limitation, computer-readable media may comprise computer storage media and communication media. Computer storage media includes volatile and non-volatile, removable and non-removable media implemented in any method or technology for storage of information such as computer-readable instructions, data structures, program modules or other data. Computer storage media includes, but is not limited to, RAM, ROM, EPROM, EEPROM, flash memory or other solid state memory technology, CD-ROM, DVD, or other optical storage, magnetic cassettes, magnetic tape, magnetic disk storage or other magnetic storage devices, or any other medium which can be used to store the desired information and which can be accessed by the computer.

According to various embodiments, the computing device 200 may operate in a networked environment using logical connections to remote computers through a network 118 which, in some implementations, may be a Transmission Control Protocol (TCP) and Internet Protocol (IP) network, such as the Internet. The computing device 200 may connect to the network 118 through a network interface 220 (e.g., a wired or wireless network interface) connected to the system bus 212. It can be appreciated that the network 118 may comprise any type of network in accordance with the described embodiments including, without limitation, a wide area network (WAN), a local area network (LAN), and/or a cellular telephone network and that the network interface 220 may support various transport layers such as GPRS, CDMA 1xRTT, IEEE 802.11, and others for connecting to a variety of networks and/or remote computer systems.

The computing device 200 may include an I/O controller 222 for receiving and processing input from a number of input devices 224. A user may enter commands and information into the computing device 200 through various input devices 224 such as a keyboard and pointing device, such as a mouse, trackball or touch pad. Other examples of input devices 224 may include a microphone, joystick, game pad, satellite dish, scanner, or the like. The input devices 224 may be connected to the processor 204 through the I/O controller 222 that is coupled to the system bus 212, but may be connected by other interfaces and bus structures, such as a parallel port, game port or a universal serial bus (USB). The I/O controller 222 also may provide output to various output devices 224, such as a monitor or other type of display device that is connected via the I/O controller 222 to the system bus 212. In various implementations, the display device may present one or more user interfaces (UIs) to a user in accordance with the described embodiments. In addition to a display device, the I/O controller 222 may provide output to a printer, speakers, and other peripheral devices.

As mentioned above, a number of program modules and data files may be stored in the mass storage device 214 and RAM 208 of the computing device 200. In the example illustrated in FIG. 2, the mass storage device 214 and RAM 208 may store various system programs and application programs. In addition to an operating system, the mass storage device 214 and RAM 208 may store the authentication proxy component 150, a resource handling module 260, a resource service application 262, and a client directory database 264. The authentication proxy component 150 may further comprise an authentication handling module 252, an authentication discovery module 254, and an authentication manager module 256. Although the authentication proxy component 150 illustrates a limited number of modules by way of example and not limitation, it may be appreciated that the authentication proxy component 150 may comprise more or less modules and still fall within the scope of the embodiments. The embodiments are not limited in this context.

In the illustrated embodiment shown in FIG. 2, the resource handling module 260 communicatively coupled to the authentication proxy component 150. The resource handling module 260 is operative to receive an access request from the client 108 to access a resource service as provided by the resource server 114 or another resource server. When the access request needs authentication operations, the resource handling module 260 passes the access request to the authentication proxy component 150 to perform basic authentication operations and enhanced authentication operations. Once the basic authentication operations and the enhanced authentication operations are complete, the authentication proxy component 150 passes the authentication results to the resource handling module 260. The resource handling module 260 sends an access response to the client 108 granting or denying access to the resource service as provided by the resource server 114 or another resource server based on the authentication results provided by the authentication proxy component 150.

The authentication proxy component 150 comprises an authentication handling module 252. The authentication handling module 252 is generally operative to manage basic authentication operations to provide initial or preliminary authentication for the client 108. In one embodiment, the authentication handling module 252 is operative to receive an authentication request to authenticate the client 108 using the basic authentication protocol 120. For example, the authentication handling module 252 may receive an authentication request as an HTTP-BASIC message. In the context of an HTTP-BASIC transaction, the basic access authentication allows the web browser 112 or the client application 113 to provide user credentials for the user 102 when making the authentication request. The user credentials may comprise, for example, a user name and password. Before transmission, the username and password are encoded as a sequence of base-64 characters. For example, the user name "Aladdin" and password "open sesame" would be combined as user credentials "Aladdin:open sesame," which when encoded in Base64 becomes the following string:

QWxhZGRpbjpvcGVuIHNlc2FtZQ

Little computational resources are needed to translate the encoded string back into the user name and password, and many popular security tools will decode the strings "on the fly" in a real-time basis.

A typical transaction between an HTTP client such as the web browser 112 and an HTTP server executed by the resource handling module 260 and/or the authentication handling module 252 of the resource server 114 begins with the web browser 112 requesting a web page that requires authentication but does not provide a user name and password. Typically this is because the user 102 simply entered the address or followed a link to the web page. The HTTP server responds with the 401 response code and provides the authentication realm. At this point, the client 108 will present the authentication realm, which is typically a description of the computer or system being accessed to the user 102 and prompt for a user name and password. The user 102 may decide to cancel at this point. Once a user name and password have been supplied, the client 108 re-sends the same request but includes the authentication header. Alternatively, the client 108 may pre-emptively send the authentication header in its first request, thereby reducing or eliminating manual interaction with the user 102. If the user name is invalid or the password incorrect, the HTTP server returns the 401 response code and the client 108 would prompt the user 102 again. If the user name is valid and the password is correct, a basic level of trust is established between the client 108 and the resource server 114. The resource server 114, however, does not return the requested web page. Rather, the authentication proxy component 150 needs to perform enhanced authentication operations prior to returning the requested web page. The authentication handling module 252 sends a message to the authentication discovery module 254 to indicate basic authentication operations have been performed, and requesting enhanced authentication operations for the client 108.

The authentication proxy component 150 also comprises an authentication discovery module 254 communicatively coupled to the authentication handling module 252. The authentication discovery module 254 is generally operative to discover the identity server 116 for the client 108. In some cases, the resource server 114 and the identity server 116 are in different realms. Consequently, the resource server 114 may not initially know a network location for the identity server 116. The resource server 114 therefore initiates discovery operations to locate the identity server 116. In one embodiment, for example, the authentication discovery module 254 may retrieve a user name communicated with the authentication request from the client 108. The authentication discovery module 254 utilizes the user name to search for a home realm for the client 108. Once the home realm for the client 108 is found, the authentication discovery module 254 searches for an identity server providing identity management services for the home realm. In this case, the identity server 116 provides the identity management services for the home realm of the client 108. The authentication discovery module 254 locates the identity server 116 serving the home realm and identifies a network address for the identity server 116, such as an Internet Protocol (IP) address or Uniform Resource Locator (URL). The authentication discovery module 254 passes this information to the authentication manager module 256 to engage in enhanced authentication operations with the identity server 116.

The authentication proxy component 150 further comprises an authentication manager module 256 communicatively coupled to the authentication discovery module 254. The authentication manager module 254 is generally operative to manage enhanced authentication operations for the user 102 and the client 108. In one embodiment, the authentication manager module 254 is operative to retrieve authentication information from the identity server 116 using the enhanced authentication protocol 130, and authenticate the client 108 to access resource services using the authentication information.

In one embodiment, for example, the identity server 116 and the authentication manager module 254 may utilize a WS-Security authentication protocol, such as WS-Federation or WS-Trust, to authenticate an identity for the user 102. The authentication manager module 256 and the identity server 116 may send and receive web service messages, such as messages complying with the Simple Object Access Protocol (SOAP) or the Global Extensible Markup Language (XML) Architecture (GXA) protocol. For example, the authentication manager module 256 and the identity server 116 may communicate GXA formatted messages, such as security tokens defined in WS-Security and Request Security Token (RST) and RST Response (RSTR) messages defined in WS-Trust, for example.

A security token may take many forms, although returned security tokens are typically encrypted. In one implementation, the security token is defined in the form of a Security Assertion Markup Language (SAML) assertion and a public key signature. SAML is an XML-based framework for ensuring that transmitted communications are secure and defines mechanisms to exchange authentication, authorization, and non-repudiation information. Other token formats, however, may also be defined.

The security tokens may comprise any type of authentication information suitable for authenticating the user 102 at a given security level. In general, security tokens may optionally contain one or more of the following properties. For example, security tokens may contain a signature of the issuing authority over the whole token. Security tokens may also contain a subject identifier uniquely identifying the entity for which the security token was granted. The SAML assertions used assure the identifiers issued are unique across the realms. The originating realm of a given security token is derivable from the subject identifier. Security tokens may further contain a recipient identifier, such as the "Audience Restriction" element in the SAML assertion. Security tokens may also contain the time of initial authentication, validity interval, and the type of authentication that was performed. Security tokens may further contain identity information, provided schema describing the additional identify information is understood by the recipient. Security tokens are typically sent over a secure connection and are encrypted with the recipient's public key known to the identity server 116 and the resource server 114.

The identity server 116 may use identifying information for the user 102 to generate authentication information for the user 102. In one embodiment, for example, the identity server 116 may verify a digital identity for the user 102 via WS-Trust, and issue a security token for the user 102. The identity server 116 may send the security token for the user 102 to the authentication manager module 256 of the resource server 114.

The resource server 114 may also comprise a client directory database 264 communicatively coupled to the authentication manager module 256. The authentication manager module 256 is operative to create a shadow account for the user 102 (or client 108) in the client directory database 264, and store the authentication information for the client 108 in the shadow account. The shadow account represents a local user account for the user 102 that is accessible via the resource server 114. The authentication manager module 256 receives the authentication information (e.g., a password and/or security token) for the user 102, creates the shadow account for the user 102, and stores the authentication information in the shadow account. For example, the authentication manager module 256 may store the password and/or security token in the shadow account. In some cases, the authentication manager module 256 stores the authentication information in a secure manner. For example, the authentication manager module 256 may store a cryptographically strong hash of the password (or security token) rather than the actual password (or security token) itself. The embodiments are not limited in this context.

The shadow account may now be used as a context to perform any subsequent authentication operations needed for the user 102 to access resource services provided by resource servers utilizing the enhanced authentication protocols 130. For example, the shadow account may be used as a context to perform challenge-response authentication operations in accordance with authentication protocols such as NTLM, among others.

Operations for the above-described embodiments may be further described with reference to one or more logic flows. It may be appreciated that the representative logic flows do not necessarily have to be executed in the order presented, or in any particular order, unless otherwise indicated. Moreover, various activities described with respect to the logic flows can be executed in serial or parallel fashion. The logic flows may be implemented using one or more hardware elements and/or software elements of the described embodiments or alternative elements as desired for a given set of design and performance constraints. For example, the logic flows may be implemented as logic (e.g., computer program instructions) for execution by a logic device (e.g., a general-purpose or specific-purpose computer).

Figure 3:
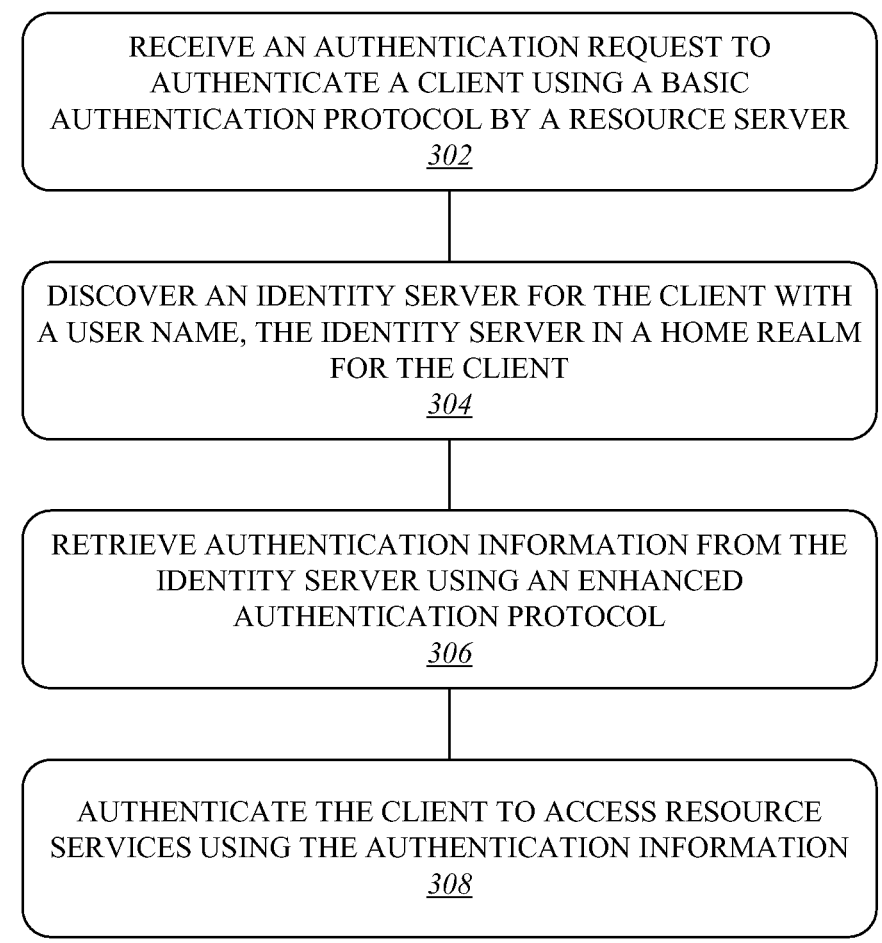
FIG. 3 illustrates an embodiment of a logic flow.

FIG. 3 illustrates one embodiment of a logic flow 300. The logic flow 300 may be representative of some or all of the operations executed by one or more embodiments described herein.

In the illustrated embodiment shown in FIG. 3, the logic flow 300 may receive an authentication request to authenticate a client using a basic authentication protocol by a resource server at block 302. For example, the authentication handling module 252 of the authentication proxy component 150 of the resource server 114 receives an authentication request to authenticate the client 108 using the basic authentication protocol 120. For example, the authentication handling module 252 may receive an authentication request as an HTTP-BASIC message. In the context of an HTTP-BASIC transaction, the basic access authentication allows the web browser 112 or the client application 113 to provide user credentials for the user 102 when making the authentication request. The user credentials may comprise, for example, a user name and password. The HTTP-BASIC protocol may be used for unsecure transactions, while the HTTP Digest Access Authentication protocol may be used for secure transactions, among others.

The logic flow 300 may discover an identity server for the client with a user name, the identity server in a home realm for the client at block 304. For example, the authentication discovery module 254 of the authentication proxy component 150 may discover the identity server 116 for the client 108. In some cases, resource server 114 and the identity server 116 are in different realms. Consequently, the resource server 114 may not initially know a network location for the identity server 116. The resource server 114 therefore initiates discovery operations to locate the identity server 116. This may be performed with the user name provided with the authentication request from the client 108.

The logic flow 300 may retrieve authentication information from the identity server using an enhanced authentication protocol at block 306. For example, the authentication manager module 254 of the authentication proxy component 150 may retrieve authentication information from the identity server 116 using the enhanced authentication protocol 130. The identity server 116 and the authentication manager module 254 may utilize a WS-Security authentication protocol, such as WS-Federation or WS-Trust, to authenticate a digital identity for the user 102. The authentication manager module 256 and the identity server 116 may communicate web service messages, such as SOAP or GXA messages, for example. The authentication information may comprise a security token suitable for use by the web services security infrastructure.

The logic flow 300 may authenticate the client to access resource services using the authentication information at block 308. For example, the authentication manager module 254 may authenticate the client 108 to access resource services using the authentication information. The resource services may be provided by the resource service application 262 of the resource server 114, or by another resource server or network device accessible via the resource server 114.

FIG. 4 illustrates an embodiment of an exemplary message flow 400. The message flow 400 may be used by various embodiments to implement the federated authentication techniques.

In the illustrated embodiment shown in FIG. 4, the message flow 400 begins with the web browser 112 or the client application 113 of the client 108 sending an access request for a resource service provided by the resource server 114 as indicated by the arrow 402. For example, assume the client application 113 is implemented as a MICROSOFT OFFICE OUTLOOK application, and the resource server 114 implements the resource service application 262 as a MICROSOFT EXCHANGE SERVER application. Further assume the client application 113 would like to access certain online web services provided by the resource service application 262, such as scheduling a meeting with a federated client already authorized to use the resource service application 262.

The resource handling module 260 of the resource server 114 determines that the resource service for which access is requested needs authentication operations prior to access. The resource handling module 260 sends a 401 response code and provides the authentication realm as indicated by the arrow 404. At this point, the client 108 will present the authentication realm, which is typically a description of the computer or system being accessed, to the user 102 and prompt for user credentials, such as a user name and password. Once the user 102 supplies a user name and password, the client 108 sends an authentication request with the user credentials to the resource server 114 as indicated by the arrow 406. The authentication request may be in the form of an HTTP-BASIC authentication request.

If the user name is valid and the password is correct, then a basic level of trust is established between the client 108 and the resource server 114. The resource server 114, however, does not grant access to the requested resource service. Rather, the authentication proxy component 150 needs to perform enhanced authentication operations prior to returning the requested web page. The authentication handling module 252 sends a message to the authentication discovery module 254 to indicate basic authentication operations have been performed, and requesting enhanced authentication operations for the client 108.

The resource server 114 receives the authentication request from the client 108, and begins enhanced authentication operations for the client 108. For example, the authentication proxy component 150 performs discovery operations for the identity server 116 using the user name and/or password. Once discovered, the authentication proxy component 150 attempts to validate the user credentials in order to perform enhanced authentication operations. For example, the authentication proxy component 150 may send a RST message with the user name for the user 102 to the identity server 116 using an enhanced authentication protocol 130 such as WS-Trust or WS-Federation as indicated by the arrow 408. The identity server 116 receives the RST message, verifies a digital identity for the user 102, and issues a security token for the user 102. The identity server 116 sends the security token for the user 102 to the resource server 114 as an RSTR message over an encrypted channel as indicated by the arrow 410.

The resource server 114 receives the RSTR message, retrieves the security token for the user 102, and stores the security token in a shadow account on the client directory database 264. The shadow account and the security token for the user 102 may now be used to perform enhanced authentication operations for the user 102. Once the enhanced authentication operations are complete, the authentication proxy component 150 passes the authentication results to the resource handling module 260. The resource handling module 260 sends an access response to the client 108 granting or denying access to the resource service as provided by the resource server 114 or another resource server based on the authentication results provided by the authentication proxy component 150, as indicated by the arrow 412. If granted, the client 108 may request access to resource services provided by the resource server 114 as indicated by the arrow 414. The resource handling module 260 may then provide access to the resource services as provided by the resource service application 262 as indicated by the arrow 416.

In some cases, the client 108 may attempt to gain access to resource services needing specialized authentication protocols, such as an HTTP RPC authentication protocol or a NTLM authentication protocol. For example, the client application 113 and the resource service application 262 may comprise messaging applications utilizing a messaging API (MAPI). The MAPI may utilize HTTP RPC for authentication operations. Similarly, some active directories may utilize NTLM as an authentication technique. In such cases, the client 108 and the resource server 114 may communicate any information needed for such specialized authentication protocols using the established HTTP channel as a network transport, and may utilize the security token stored in the shadow account of the user 102 as the requisite authentication information, as indicated by the arrows 418, 420.

FIG. 5 illustrates a diagram an article of manufacture 500 suitable for storing logic for the various embodiments. As shown, the article of manufacture 500 may comprise a storage medium 502 to store logic 504. Examples of the storage medium 502 may include one or more types of computer-readable storage media capable of storing electronic data, including volatile memory or non-volatile memory, removable or non-removable memory, erasable or non-erasable memory, writeable or re-writeable memory, and so forth. Examples of the logic 504 may include various software elements, such as software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof.

In one embodiment, for example, the article of manufacture 500 and/or the computer-readable storage medium 502 may store logic 504 comprising executable computer program instructions that, when executed by a computer, cause the computer to perform methods and/or operations in accordance with the described embodiments. The executable computer program instructions may include any suitable type of code, such as source code, compiled code, interpreted code, executable code, static code, dynamic code, and the like. The executable computer program instructions may be implemented according to a predefined computer language, manner or syntax, for instructing a computer to perform a certain function. The instructions may be implemented using any suitable high-level, low-level, object-oriented, visual, compiled and/or interpreted programming language, such as C, C++, Java, BASIC, Perl, Matlab, Pascal, Visual BASIC, assembly language, and others.

Various embodiments may be implemented using hardware elements, software elements, or a combination of both. Examples of hardware elements may include any of the examples as previously provided for a logic device, and further including microprocessors, circuits, circuit elements (e.g., transistors, resistors, capacitors, inductors, and so forth), integrated circuits, logic gates, registers, semiconductor device, chips, microchips, chip sets, and so forth. Examples of software elements may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints, as desired for a given implementation.

Some embodiments may be described using the expression "coupled" and "connected" along with their derivatives. These terms are not necessarily intended as synonyms for each other. For example, some embodiments may be described using the terms "connected" and/or "coupled" to indicate that two or more elements are in direct physical or electrical contact with each other. The term "coupled," however, may also mean that two or more elements are not in direct contact with each other, but yet still co-operate or interact with each other.

It is emphasized that the Abstract of the Disclosure is provided to comply with 37 C.F.R. Section 1.72(b), requiring an abstract that will allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separate embodiment. In the appended claims, the terms "including" and "in which" are used as the plain-English equivalents of the respective terms "comprising" and "wherein," respectively. Moreover, the terms "first," "second," "third," and so forth, are used merely as labels, and are not intended to impose numerical requirements on their objects.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

The invention claimed is:

1. A method, comprising:
    receiving, at a resource server, an authentication request from a client to authenticate the client with a basic authentication protocol;
    authenticating the client at the resource server using the basic authentication protocol, wherein the client is not capable of using a security token suitable for an enhanced authentication protocol to authenticate with the resource server;
    using user credentials gained during the basic authentication at the resource server to discover a home realm for the client;
    discovering an identity server, by the resource server, providing identity management services for the home realm for the client, wherein the identity server and the resource server are in different realms;
    retrieving authentication information comprising the security token, by the resource server, from the identity server with the enhanced authentication protocol using the user credentials gained during the basic authentication;
    storing the security token in a shadow account created for the client by the resource server as a context to perform any subsequent authentication operation needed to access resource services provided by servers utilizing the enhanced authentication protocol; and
    authenticating the client to access resource services using the security token and the shadow account.

2. The method of claim 1, comprising performing enhanced authentication operations using the security token and the shadow account for the client.

3. The method of claim 1, comprising storing the authentication information for the client in a local user account for the client created by the resource server.

4. The method of claim 1, comprising receiving an access request to access a resource service as provided by the resource server from the client.

5. The method of claim 1, comprising sending an access response to the client from the resource server granting access to a resource service as provided by the resource server.

6. The method of claim 1, comprising receiving an access request to access a resource service as provided by a different resource server from the client.

7. The method of claim 1, comprising sending an access response to the client from the resource server granting access to a resource service as provided by a different resource server.

8. The method of claim 1, wherein the basic authentication protocol comprises a Hypertext Transfer Protocol (HTTP) Basic Access Authentication (BASIC) authentication protocol (HTTP-BASIC), a NT Local Area Network Manager (NTLM) authentication protocol, or a Remote Procedure Call (RPC) authentication protocol.

9. The method of claim 1, wherein the enhanced authentication protocol comprises a web services security authentication protocol.

10. An article comprising a computer-readable memory containing instructions that if executed enable a system to:
    receive, at a resource server, an authentication request from a client to authenticate the client with a basic authentication protocol;
    authenticate the client at the resource server using the basic authentication protocol, wherein the client is not capable of using a security token corresponding to a web services security authentication protocol;
    send user credentials gathered using the basic authentication protocol to an identity server wherein the identity server and the resource server are logically in a same organization but the identity server is physically in a different location than the client at the resource server;
    retrieve authentication information comprising the security token, by the resource server, from the identity server for the client with the web services security authentication protocol using the user credentials communicated with the authentication request;
    store the authentication information and the security token in a shadow account created for the client by the resource server and used as a context to perform enhanced authentication operations needed to access resource services provided by servers utilizing the web services authentication protocol;
    performing the enhanced authentication operations on behalf of the client using the security token; and
    authenticate the client to access resource services using the authentication information.

11. The article of claim 10, further comprising instructions that if executed enable the system to create a local user account for the client by the resource server.

12. The article of claim 10, further comprising instructions that if executed enable the system to receive an access request from the client to access a resource service as provided by the resource server or another resource server.

13. The article of claim 10, further comprising instructions that if executed enable the system to send an access response to the client from the resource server granting access to a resource service as provided by the resource server or another resource server.

14. An apparatus, comprising:
    a resource server having a processor and an authentication proxy component executed on the processor to perform over a secure connection enhanced authentication operations on behalf of a client that is incapable of performing the enhanced authentication operations over the secure connection, the authentication proxy component comprising:
    an authentication handling module to receive an authentication request to authenticate the client and to authenticate the client with a basic authentication protocol;
    an authentication discovery module communicatively coupled to the authentication handling module, the authentication discovery module to use user credentials gained during the basic authentication to discover a home realm for the client and to discover an identity server providing identity management services for the home realm for the client, wherein the identity server and the resource server are in different realms; and an authentication manager module communicatively coupled to the authentication discovery module, the authentication manager module to retrieve over the secure connection authentication information from the identity server using the user credentials gained during the basic authentication, store the authentication information and the security token in a shadow account created for the client and accessible as a local user account by the resource server, and perform the enhanced authentication operations to authenticate the client to access the resource services.

15. The apparatus of claim 14, comprising a client directory database communicatively coupled to the authentication manager module, the authentication manager module to create a shadow account for the client in the client directory database, and store the authentication information for the client in the shadow account.

16. The apparatus of claim 14, comprising a resource handling module communicatively coupled to the authentication manager module, the resource handling module to receive an access request from the client to access a resource service as provided by the resource server or another resource server, and send an access response to the client granting or denying access to the resource service as provided by the resource server or another resource server.

17. The apparatus of claim 14, the basic authentication protocol comprising a Hypertext Transfer Protocol (HTTP) Basic Access Authentication (BASIC) authentication protocol (HTTP-BASIC), a NT Local Area Network Manager (NTLM) authentication protocol, or a Remote Procedure Call (RPC) authentication protocol.

18. The apparatus of claim 14, the enhanced authentication operations corresponding to an enhanced authentication protocol comprising a web services security authentication protocol.

* * * * *